United States Patent
Sung et al.

(10) Patent No.: US 10,868,330 B2
(45) Date of Patent: Dec. 15, 2020

(54) SOLID ELECTROLYTE AND PREPARING METHOD THEREOF

(71) Applicants: Hyundai Motor Company, Seoul (KR); Kia Motors Corporation, Seoul (KR)

(72) Inventors: Ju Young Sung, Hwaseong-si (KR); Jae Min Lim, Suwon-si (KR); Yong Jun Jang, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 380 days.

(21) Appl. No.: 15/813,673

(22) Filed: Nov. 15, 2017

(65) Prior Publication Data
US 2018/0138546 A1 May 17, 2018

(30) Foreign Application Priority Data
Nov. 16, 2016 (KR) .................. 10-2016-0152476

(51) Int. Cl.
| | |
|---|---|
| *H01M 10/0562* | (2010.01) |
| *H01M 10/0525* | (2010.01) |
| *H01M 10/058* | (2010.01) |
| *B02C 17/18* | (2006.01) |
| *C01G 53/00* | (2006.01) |
| *C01B 17/22* | (2006.01) |
| *H01M 10/052* | (2010.01) |

(52) U.S. Cl.
CPC ......... *H01M 10/0562* (2013.01); *B02C 17/18* (2013.01); *C01B 17/22* (2013.01); *C01G 53/006* (2013.01); *H01M 10/052* (2013.01); *H01M 10/058* (2013.01); *H01M 10/0525* (2013.01); *H01M 2300/008* (2013.01); *H01M 2300/0068* (2013.01)

(58) Field of Classification Search
CPC .................................................. H01M 10/0525
See application file for complete search history.

(56) References Cited

U.S. PATENT DOCUMENTS

| | | | |
|---|---|---|---|
| 2005/0107239 A1 | 5/2005 | Akiba et al. | |
| 2011/0049745 A1* | 3/2011 | Katayama | ......... H01M 10/0585 264/104 |
| 2012/0301796 A1 | 11/2012 | Ohtomo et al. | |

FOREIGN PATENT DOCUMENTS

| | | |
|---|---|---|
| JP | 2003208919 A | 7/2003 |
| KR | 1020120095987 A | 8/2012 |

OTHER PUBLICATIONS

Julien, C., et al., "Ionic Transport in LixNiPS3," Indo-French Centre for the Promotion of Advanced Research (IFCPAR), Dec. 1994, vol. 1, No. 5, 8 pages.

* cited by examiner

*Primary Examiner* — Stephan J Essex
(74) *Attorney, Agent, or Firm* — Slater Matsil, LLP

(57) ABSTRACT

A method of preparing a solid electrolyte includes preparing a mixed powder with a sulfur powder, a phosphorus powder and a lithium powder. The sulfur in the sulfur powder, the phosphorus in the phosphorus powder, and the lithium in the lithium powder are each in an elemental form. The mixed powder is milled to obtain an amorphous powder. The method includes heat-treating the amorphous powder to form a crystallized solid electrolyte.

19 Claims, 9 Drawing Sheets

SOLID ELECTROLYTE AND PREPARING METHOD THEREOF

CROSS-REFERENCE TO RELATED APPLICATIONS

This application claims under 35 U.S.C. § 119(a) the benefit of Korean Patent Application No. 10-2016-0152476 filed on Nov. 16, 2016, the entire contents of which are incorporated herein by reference.

TECHNICAL FIELD

The present disclosure relates to a solid electrolyte derived from a single element powder which is not based on compound powder and a preparing method thereof.

BACKGROUND

Today, secondary batteries have been widely used from large devices such as a vehicle and a power storage system to small devices such as a mobile phone, a camcorder, and a laptop.

As the secondary battery is widely applied, the demand for improved safety and high performance of the battery has been increased.

A lithium secondary battery which is one of the secondary batteries has an advantage in that energy density is higher and a capacity per unit area is larger than a nickel-manganese battery or a nickel-cadmium battery.

However, most of electrolytes used in the lithium secondary batteries in the related art are liquid electrolytes such as organic solvents. Accordingly, safety problems such as leakage of electrolytes and the risk of fire resulting there from have been constantly raised.

As a result, recently, to increase safety, an interest in all-solid-state batteries using solid electrolytes rather than liquid electrolytes as the electrolytes has been increased.

The solid electrolyte has higher safety than the liquid electrolyte due to a non-combustible or flame-retardant property.

The solid electrolytes are divided into an oxide-based electrolyte and a sulfide-based electrolyte. The sulfide-based solid electrolyte has high lithium-ionic conductivity compared to the oxide-based solid electrolyte and is stable in a wide voltage range and thus the sulfide-based solid electrolyte is frequently used.

In Korean Patent Application Publication No. 10-2012-0095987, there is disclosed a sulfide-based solid electrolyte manufactured by mixing and then vitrifying $Li_2S$ and $P_2S_5$. As such, in the related art, a sulfide-based solid electrolyte was manufactured by using a compound type starting material. The cost of the compound type starting material such as $Li_2S$ is very high as about 5 million won/kg. Further, recently, attempts to improve the sulfide-based solid electrolyte by mixing a compound such as $GeS_2$ with $Li_2S$ and $P_2S_5$ have been increased and thus the cost of the material is further increased. The high material cost is a great obstacle to a large area of the battery according to the demand of a large-capacity energy storage technology.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

An object of the present invention is to provide a method of preparing a new solid electrolyte without using a compound type powder as a starting material.

Another object of the present invention is to provide a solid electrolyte suitable for a large area of a battery and a preparing method thereof.

The objects of the present invention are not limited to the objects described above. The objects of the present invention will be more apparent in the description below and implemented by means described in the claims and a combination thereof.

The present invention includes the following configurations in order to achieve the above objects.

In one aspect, the present invention provides a solid electrolyte derived from a single element including: a sulfur (S) element derived from a simple substance sulfur powder; a phosphorus (P) element derived from a simple substance phosphorus powder; and a lithium (Li) element derived from a simple substance lithium powder.

In a preferred embodiment, the solid electrolyte derived from a single element may be expressed by $Li_{2x}P_{2y}S_{x+5y}$ ($0.65 \leq x \leq 0.85$, $0.15 \leq y \leq 0.35$).

In another preferred embodiment, the solid electrolyte derived from a single element may further include a nickel (Ni) element derived from a simple substance nickel powder, in which the solid electrolyte may be expressed by $Li_aP_bS_cNi_d$ ($12 \leq a \leq 18$, $0.8 \leq b \leq 6.4$, $13.2 \leq c \leq 26$, $1.2 \leq d \leq 9.6$).

In still another preferred embodiment, the solid electrolyte derived from a single element may further include a chlorine (Cl) element derived from a lithium chloride (LiCl) powder, in which the solid electrolyte may be expressed by $Li_aP_bS_cNi_dCl_e$ ($12 \leq a \leq 22$, $0.8 \leq b \leq 6.4$, $13.2 \leq c \leq 26$, $1.2 \leq d \leq 9.6$, $1 \leq e \leq 4$).

In another aspect, the present invention provides a method of preparing a solid electrolyte derived from a single element, the method including: (1) preparing a mixed powder containing a simple substance sulfur powder, a simple substance phosphorus powder and a simple substance lithium powder; (2) milling the mixed powder to obtain an amorphous powder; and (3) heat-treating the amorphous powder to crystallize.

In a preferred embodiment, the mixed powder in step (1) may be mixed by measuring the simple substance sulfur powder, the simple substance phosphorus powder and the simple substance lithium powder according to a composition of $Li_{2x}P_{2y}S_{x+5y}$ ($0.65 \leq x \leq 0.85$, $0.15 \leq y \leq 0.35$).

In another preferred embodiment, the mixed powder may consist of the simple substance sulfur powder, the simple substance phosphorus powder and the simple substance lithium powder.

In still another preferred embodiment, the amorphous powder may be obtained by milling the mixed powder under conditions of 300 RPM to 1000 RPM and 4 hrs to 40 hrs by using a planetary mill.

In yet another preferred embodiment, step (2) may be a step of mixing 1 wt % to 50 wt % of the mixed powder and 50 wt % to 99 wt % of a solvent and then wet-milling the mixture.

In still yet another preferred embodiment, the solvent may be any one selected from a group consisting of at least one hydrocarbon-based solvent of pentane, hexane, 2-ethyl hexane, heptane, octane, cyclohexane, and methyl cylcohexane; at least one BTX-based solvent of benzene, toluene, xylene, and ethylbenzene; at least one ether-based solvent of diethyl ether, tetrahydrofuran and 1,4-dioxane; and at least one ester-based solvent of ethyl propionate and propyl propionate or a mixed solvent thereof.

In a further preferred embodiment, the crystallizing in step (3) may be performed by heat-treating the amorphous powder at 200° C. to 500° C. and 1 min to 100 hrs.

In another further preferred embodiment, steps (1) to (3) may be performed in a dry room.

In still another further preferred embodiment, in step (1), a simple substance nickel powder may be further mixed with the mixed powder, and the simple substance sulfur powder, the simple substance phosphorus powder, the simple substance lithium powder and the simple substance nickel powder may be measured according to a composition of $Li_aP_bS_cNi_d$ (12≤a≤16, 0.8≤b≤6.4, 13.2≤c≤23.6, 1.2≤d≤9.6) and mixed. In yet another further preferred embodiment, in step (1), a simple substance nickel powder and a lithium chloride powder may be further mixed with the mixed powder, and the simple substance sulfur powder, the simple substance phosphorus powder, the simple substance lithium powder, the simple substance nickel powder and the lithium chloride powder may be measured according to a composition of $Li_aP_bS_cNi_dCl_e$ (12≤a≤20, 0.8≤b≤6.4, 13.2≤c≤23.6, 1.2≤d≤9.6, 1≤e≤4) and mixed.

In still yet another aspect, the present invention provides an all solid-state battery including a positive electrode, a negative electrode, and a solid electrolyte layer interposed between the positive electrode and the negative electrode, in which at least one of the positive electrode, the negative electrode, and the solid electrolyte layer includes the solid electrolyte derived from the single element.

According to the present invention, a solid electrolyte having lithium-ionic conductivity and discharge capacity when applying a battery which are equal to or higher than those in the related art can be manufactured at costs of less than about 5% compared with the related art. Accordingly, the solid electrolyte according to the present invention can largely contribute to a large area of an all solid-state battery.

As the solid electrolyte derived from the single element, the composition can be easily changed and induction for development of various solid electrolytes having different ratios of elements of lithium, phosphorus, sulfur, and the like can be provided.

The solid electrolyte can be prepared safely and cheaply because a separate device such as a glove box is not required.

The effects of the present invention are not limited to the aforementioned effects. It should be understood that the effects of the present invention include all effects inferable from the description below.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein:

FIG. 2A is a result for Example 1, FIG. 2B is a result for Example 2, and FIG. 2C is a result for Example 3;

Figure 1:
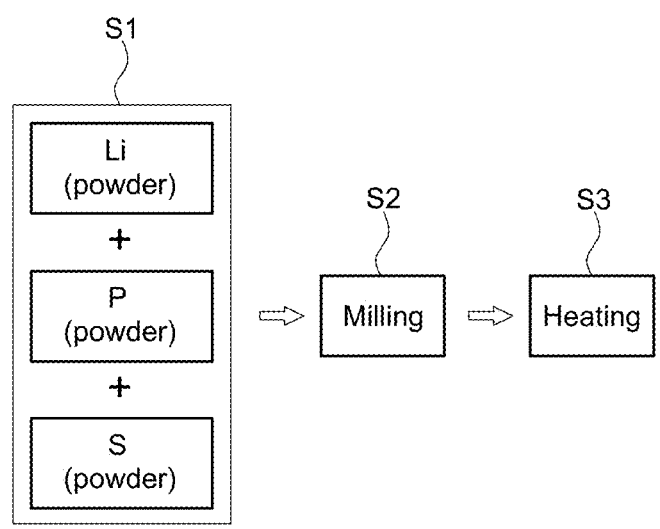
FIG. 1 schematically illustrates a method of preparing a solid electrolyte according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through exemplary embodiments. The exemplary embodiments of the present invention may be modified in various forms as long as the gist of the invention is not changed. However, the scope of the present invention is not limited to the following exemplary embodiments.

When it is determined that the description for the known configurations and functions may obscure the gist of the present invention, the description for the known configurations and functions will be omitted. In this specification, the term "comprise" means that other constituent elements may be further included unless otherwise listed.

A solid electrolyte derived from a single element according to the present invention may include a sulfur (S) element derived from a simple substance sulfur powder, a phosphorus (P) element derived from a simple substance phosphorus powder and a lithium (Li) element derived from a simple substance lithium powder.

As illustrated in FIG. 1, the solid electrolyte derived from the single element may be prepared by (1) preparing a mixed powder containing a simple substance sulfur powder, a simple substance phosphorus powder and simple substance lithium powder (S1), (2) milling and amorphizing the mixed powder (S2), and (3) heat-treating and crystallizing the amorphized mixed powder (S3).

In this specification, the 'simple substance' means a single element material constituted by a single element to have a unique chemical property. Accordingly, the simple substance sulfur powder means a powder state of the simple substance sulfur which is constituted by only the sulfur (S) element to have a unique chemical property, the simple substance phosphorus powder means a powder state of the simple substance phosphorus which is constituted by only the phosphorus (P) element to have a unique chemical property, and the simple substance lithium powder means a powder state of the simple substance lithium which is constituted by only the lithium (Li) element to have a unique chemical property.

In the related art, in order to manufacture the sulfide-based solid electrolyte such as $Li_3PS_4$, a starting material in which $Li_2S$ and $P_2S_5$ are mixed at a mole % ratio of 75:25 was used. In the related art, in the case of using a compound type starting material, material cost is very high. In the case of the starting material ($75Li_2S$-$25P_2S_5$), the material cost reaches about 5 million won/kg (approximately USD$4500/Kg). Further, since $Li_2S$ is vulnerable to moisture and $P_2S_5$ is a compound that has a high risk of explosion in air, the materials need to be handled in a separate glove box.

Embodiments of the present invention are contrived to solve the above problems and constraints and have a technical feature that the solid electrolyte is prepared from the starting material mixed by measuring the simple substance sulfur powder, the simple substance phosphorus powder, and the simple substance lithium powder according to the composition of the desired solid electrolyte.

In various embodiments of the present invention, since the simple substance sulfur powder, the simple substance phosphorus powder, the simple substance lithium powder, and the like are used as the starting material, the material cost is about 150,000 won/kg (approximately USD$135/Kg) and thus the solid electrolyte may be prepared at significantly low cost compared to the case of using the compound type powder. That is, embodiments of the present invention have a technical significance in that it is verified that when the solid electrolyte is prepared by amorphizing and crystallizing the mixed powder, the solid electrolyte having excellent lithium ion conductivity, discharging capacity when applied to the battery, and the like can be obtained at low cost.

Embodiments of the present invention have advantages of preparing the solid electrolyte safely and easily without requiring a separate device such as a glove box because a compound type starting material which is harmful to the human body, vulnerable to moisture, or has the risk of explosion is not used.

In particular, step (1) is a step of preparing the mixed powder containing the simple substance sulfur powder, the simple substance phosphorus powder, and the simple substance lithium powder.

The simple substance lithium powder may be replaced with a single material containing a lithium metal. The single material may correspond to any material which may be mixed and amorphized with the simple substance sulfur powder, the simple substance phosphorus powder, and the like by milling and the like, not the compound type, and for example, lithium foil and the like.

According to an exemplary embodiment of the present invention, step (1) may be a step of preparing a mixed powder by measuring and mixing the simple substance sulfur powder, the simple substance phosphorus powder, and the simple substance lithium powder according to a composition of $Li_{2x}P_{2y}S_{x+5y}$ ($0.65 \leq x \leq 0.85$, $0.15 \leq y \leq 0.35$) which is a desired solid electrolyte.

Step (2) may be a step of milling and amorphizing the mixed powder. Particularly, the amorphizing may be milling the mixed powder under conditions of 300 RPM to 1,000 RPM and 4 hrs to 40 hrs by using a planetary mill.

The amorphizing may be performed by wet milling or dry milling and preferably performed by wet milling for uniform formation of the crystal when the crystallization is performed through heat-treating.

The wet milling may be wet milling by mixing 1 wt % to 50 wt % of the mixed powder and 50 wt % to 99 wt % of the solvent, preferably 4 wt % to 20 wt % of the mixed powder and 80 wt % to 96 wt % of the solvent, and more preferably 5 wt % to 15 wt % of the mixed powder and 75 wt % to 95 wt % of the solvent. When the mixed powder is less than 1 wt %, the yield is too low and thus it may not be suitable for mass production, and when the mixed powder is more than 50 wt %, it may be difficult to obtain a uniformly amorphized material like dry milling.

The solvent may be any one selected from a group consisting of at least one hydrocarbon-based solvent of pentane, hexane, 2-ethyl hexane, heptane, octane, cyclohexane, and methyl cyclohexane; at least one BTX-based solvent of benzene, toluene, xylene, and ethylbenzene; at least one ether-based solvent of diethyl ether, tetrahydrofuran and 1,4-dioxane; and at least one ester-based solvent of ethyl propionate and propyl propionate, or a mixed solvent thereof. However, in embodiments of the present invention, the solvent is not limited thereto and it is understood that the solvent includes all solvents which are mainly used for wet milling through a planetary mill.

Step (3) may be a step of heat-treating and crystallizing the amorphized mixed powder through milling. In detail, the crystallization may be heat-treating the mixed powder under conditions of 200° C. to 500° C. and 1 min to 100 hrs.

In the case of amorphizing the mixed powder through wet milling in step (2), a drying step before performing step (3) may be further performed. The dry step is to remove the remaining solvent in the milled mixed powder and may be vacuum drying, heat drying, or vacuum and heat drying under conditions of room temperature to 200° C. and 1 min to 10 hrs.

The preparing method of the solid electrolyte derived from the single element according to the present invention does not need to be performed in the glove box because the mixed powder is used as the starting material. Accordingly, steps (1) to (3) may be performed in a dry room.

According to another exemplary embodiment of the present invention, in step (1), the simple substance nickel powder is further mixed with the mixed powder to obtain a solid electrolyte further containing a nickel (Ni) element derived from the simple substance nickel powder.

Particularly, steps (2) and (3) are performed by using the mixed powder, as the starting material, mixed by measuring the simple substance sulfur powder, the simple substance phosphorus powder, the simple substance lithium powder and the simple substance nickel powder in step (1) according to a composition of $Li_aP_bS_cNi_d$ (12≤a≤18, 0.8≤b≤6.4, 13.2≤c≤26, 1.2≤d≤9.6) as a desired solid electrolyte, respectively, to prepare the solid electrolyte containing the nickel element.

According to yet another exemplary embodiment of the present invention, the simple substance nickel powder and a lithium chloride (LiCl) powder are further mixed in the mixed powder in step (1) to obtain the solid electrolyte containing a nickel (Ni) element derived from the simple substance nickel powder and a chlorine (Cl) element derived from the lithium chloride powder.

Particularly, steps (2) and (3) are performed by using the mixed powder, as the starting material, mixed by measuring the simple substance sulfur powder, the simple substance phosphorus powder, the simple substance lithium powder, the simple substance nickel powder and the lithium chloride powder in step (1) according to a composition of $Li_aP_bS_cNi_dCl_e$ (12≤a≤22, 0.8≤b≤6.4, 13.2≤c≤26, 1.2≤d≤9.6, 1≤e≤4) as a desired solid electrolyte, respectively, to prepare the solid electrolyte containing the nickel element and the chloride element.

As such, the present invention has an advantage in that the composition of the solid electrolyte is easily changed, removed, and added by using the simple substance phosphorus material, not the compound type material as the starting material. Accordingly, the present invention can also provide induction in the development of solid electrolytes having various compositions.

Hereinafter, the present invention will be described in more detail through detailed Examples and Test Examples. However, these Examples and Test Examples are to exemplify the present invention and the scope of the present invention is not limited thereto.

EXAMPLES

The following examples illustrate the invention and are not intended to limit the same.

Example 1

In order to prepare a solid electrolyte represented by $Li_3PS_4$ (75$Li_2S$-25$P_2S_5$), the following steps were performed. A simple substance sulfur powder (Sigma Aldrich Corporation, sulfur), a simple substance phosphorus powder (Sigma Aldrich Corporation, phosphorous), and a simple substance lithium powder (FMC Corporation, lithium powder) were used as a starting material. 7.12 g of the simple substance sulfur powder, 1.72 g of the simple substance phosphorus powder, and 1.16 g of the simple substance lithium powder were measured and mixed to have the same composition ratio (mole ratio) as 75$Li_2S$-25$P_2S_5$ to prepare a mixed powder. 82.5 g of xylene was mixed with the mixed powder and then put into a planetary ball mill container together with 575 g of zirconia balls. The mixed powder was milled and amorphized at about 360 RPM. Thereafter, the obtained mixed powder was vacuum-dried for 2 hrs at about 160° C. to remove the remaining xylene. Next, the mixed powder was heat-treated for 2 hrs at 230° C. and crystallized to obtain the solid electrolyte.

Example 2

Except for using lithium foil (HONJO METAL Corporation, purity 99.9%) instead of the simple substance lithium powder as a starting material, a solid electrolyte was prepared by the same material and method as Example 1.

Example 3

In order to prepare a solid electrolyte represented by $Li_3PS_4$ (75$Li_2S$-25$P_2S_5$), the following steps were performed. A simple substance sulfur powder (Sigma Aldrich Corporation, sulfur), a simple substance phosphorus powder (Sigma Aldrich Corporation, phosphorous), and lithium foil (HONJO METAL Corporation, purity 99.9%) were used as a starting material. 7.12 g of the simple substance sulfur powder, 1.72 g of the simple substance phosphorus powder, and 1.16 g of the lithium foil were measured and mixed to have the same composition ratio (mole ratio) as 75$Li_2S$-25$P_2S_5$ to prepare a mixed powder. The mixed powder was put into a planetary ball mill container together with 300 g of zirconia balls. The mixed powder was milled and amorphized at about 360 RPM. Next, the mixed powder was heat-treated for 2 hrs at 230° C. and crystallized to obtain the solid electrolyte.

Figure 2:
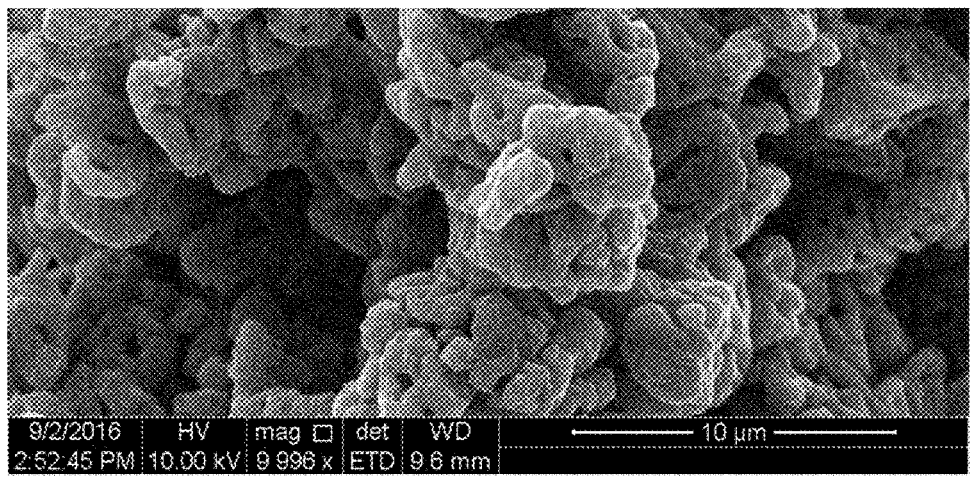
FIG. 2 is a scanning electron microscope (SEM) measurement result for a solid electrolyte in Examples 1 to 3.
Figure 2:
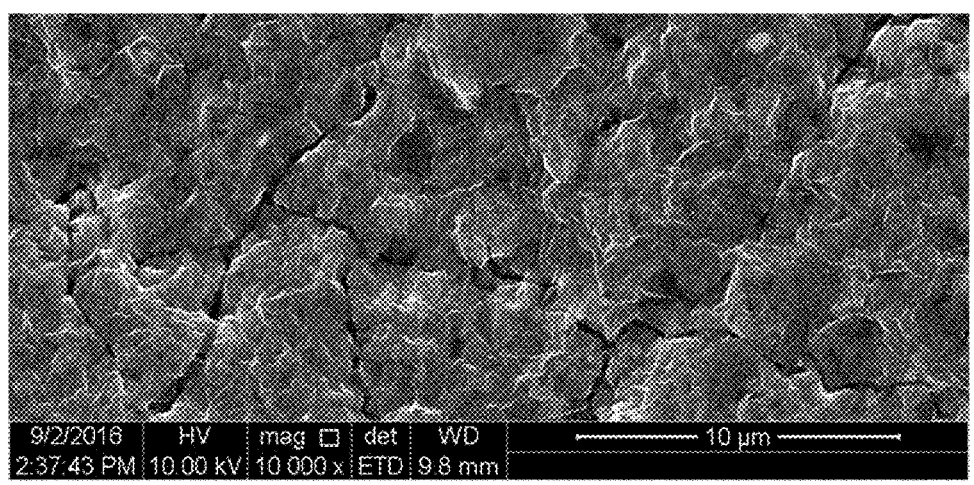
Figure 2:
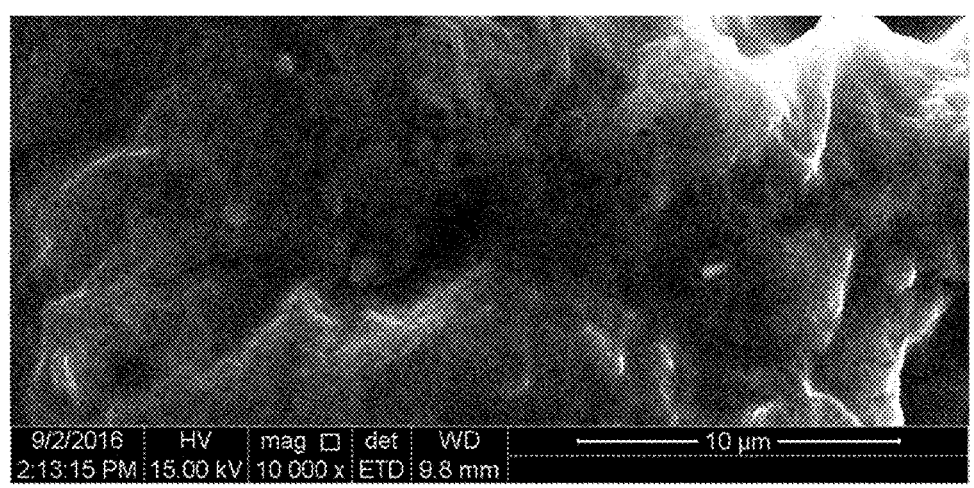

FIG. 2 is a scanning electron microscope (SEM) measurement result for a solid electrolyte in Examples 1 to 3. FIG. 2A is a result for Example 1, FIG. 2B is a result for Example 2, and FIG. 2C is a result for Example 3.

It can be seen that the crystal of the solid electrolyte in Example 1 (the simple substance lithium powder and wet milling) is uniformly formed and it can be verified that in Example 2 (lithium foil and wet milling) and Example 3 (lithium foil and dry milling), the formation of crystals is slightly uneven.

Figure 3:
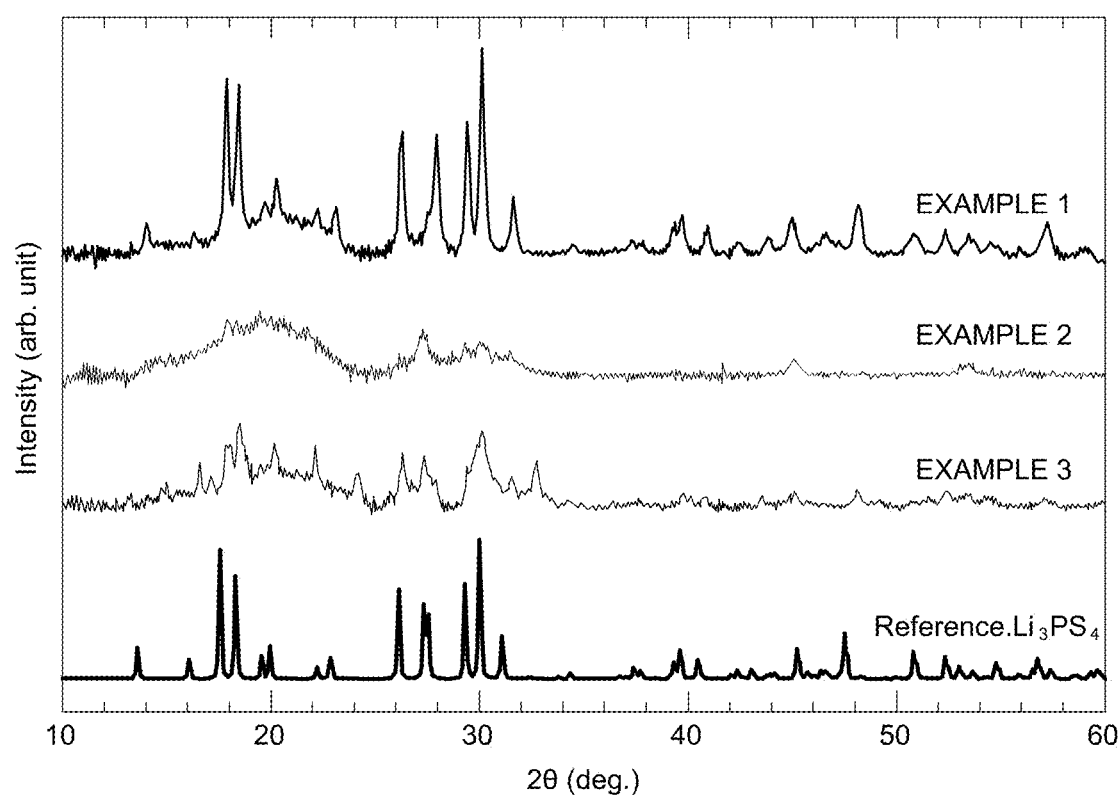
FIG. 3 is an X-ray diffraction spectroscopy (XRD) result for the solid electrolyte in Examples 1 to 3.

This can be seen from an X-ray diffraction spectroscopy (XRD) result for the solid electrolyte in Examples 1 to 3 in FIG. 3. It can be verified that the solid electrolyte in Example 1 has substantially the same peak as $Li_3PS_4$ which is a similar phase as THIO-LISICON III, whereas in the solid electrolytes in Examples 2 and 3, the peaks are clearly separated and not measured and thus the growth and the uniformity of the crystals slightly deteriorate.

Accordingly, in the preparation of the solid electrolyte according to the present invention, like Example 1, the mixed powder may be prepared by using a simple substance lithium powder as a starting material and amorphized by wet milling and then crystallized.

Example 4

In order to prepare a solid electrolyte represented by $Li_{16}P_4S_{20}Ni_3$ (8$Li_2S$-2$P_2S_5$-1$Ni_3S_2$), the following steps were performed. As a starting material, a simple substance sulfur powder, a simple substance phosphorus powder, a simple substance lithium powder and a simple substance nickel powder were used. 6.09 g of the simple substance sulfur powder, 1.18 g of the simple substance phosphorus powder, 1.06 g of the simple substance lithium powder, and 1.67 g of the simple substance nickel powder were measured and mixed to have the same composition ratio (mole ratio) as 8$Li_2S$-2$P_2S_5$-1$Ni_3S_2$ to prepare a mixed powder. 82.5 g of xylene was mixed with the mixed powder and then put into a planetary ball mill container together with 575 g of zirconia balls. The mixed powder was milled and amorphized at about 360 RPM. Thereafter, the obtained mixed powder was vacuum-dried for 2 hrs at about 160° C. to remove the remaining xylene. Next, the mixed powder was heat-treated for 2 hrs at 260° C. and crystallized to obtain the solid electrolyte.

Example 5

In order to prepare a solid electrolyte represented by $Li_{20}P_4S_{20}Ni_3Cl_4(8Li_2S-2P_2S_5-1Ni_3S_2-4LiCl)$, the following steps were performed. As a starting material, a simple substance sulfur powder, a simple substance phosphorus powder, a simple substance lithium powder, a simple substance nickel powder and a lithium chloride powder were used. 5.25 g of the simple substance sulfur powder, 1.01 g of the simple substance phosphorus powder, 0.91 g of the simple substance lithium powder, 1.44 g of the simple substance nickel powder, and 1.39 g of the lithium chloride powder were measured and mixed to have the same composition ratio (mole ratio) as $8Li_2S-2P_2S_5-1Ni_3S_2-4LiCl$ to prepare a mixed powder. 82.5 g of xylene was mixed with the mixed powder and then put into a planetary ball mill container together with 575 g of zirconia balls. The mixed powder was milled and amorphized at about 360 RPM. Thereafter, the obtained mixed powder was vacuum-dried for 2 hrs at about 160° C. to remove the remaining xylene. Next, the mixed powder was heat-treated for 2 hrs at 260° C. and crystallized to obtain the solid electrolyte.

Figure 4:
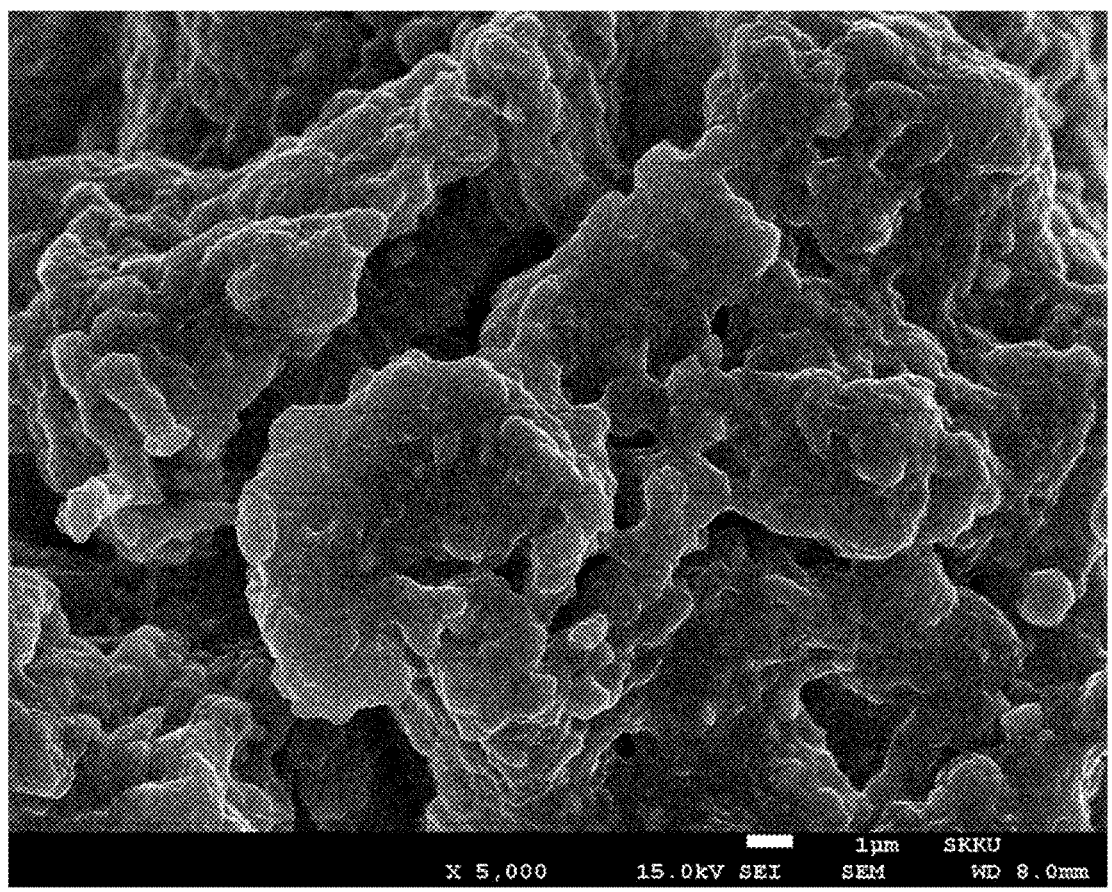
FIG. 4 is an SEM measurement result for a solid electrolyte in Example 4.
Figure 5:
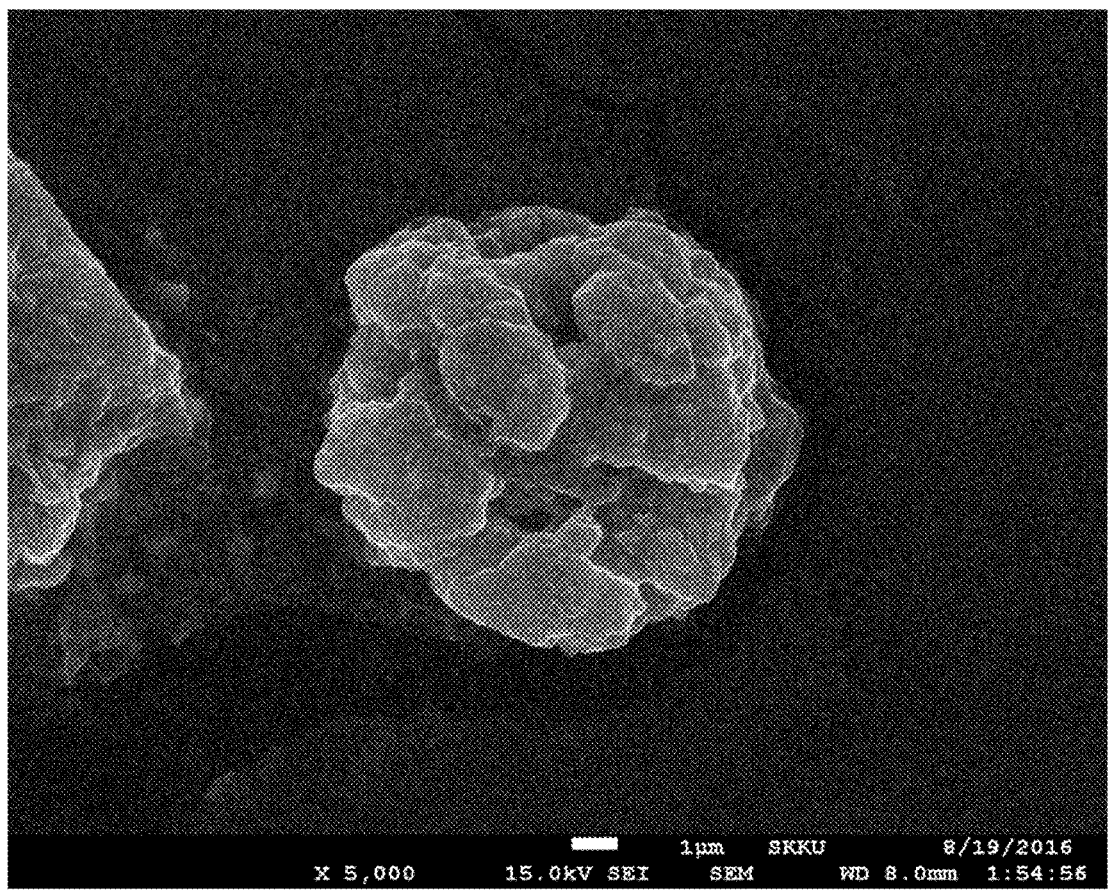
FIG. 5 is an SEM measurement result for a solid electrolyte in Example 5.

FIG. 4 is an SEM measurement result for a solid electrolyte in Example 4 and FIG. 5 is an SEM measurement result for a solid electrolyte in Example 5. In Examples 4 and 5, like Example 1, it can be seen that the simple substance lithium powder is used as the starting material and amorphized by wet milling and then crystallized, and thus the crystals are uniformly formed.

Hereinafter, for convenience of description, the solid electrolytes in Examples 1, 4, and 5 are referred to as LSPS, LNPS and LNPS-Cl, respectively, and called according to a kind of element included in each solid electrolyte.

TEST EXAMPLES

Test Example 1

Lithium-ionic conductivities of solid electrolytes in Example 1 (LSPS), Example 4 (LNPS) and Example 5 LNPS-Cl) were measured. LSPS, LNPS and LNPS-Cl were compressively molded to form a molding body for measurement (with a diameter of 13 mm and a thickness of 0.6 mm). An AC potential of 10 mV was applied to the molding body and then an impedance value was measured by performing a frequency sweeping of $1 \times 10^6$ to 100 Hz to see lithium-ion conductivity.

As a result, the lithium-ionic conductivities of $1.0 \times 10^{-4}$ S/cm of the LSPS in Example 1, $1.4 \times 10^{-4}$ S/cm of the LNPS in Example 4, and $1.4 \times 10^{-3}$ S/cm of the LNPS-Cl in Example 5 were shown.

Test Example 2

The lithium ion transport number of the solid electrolytes according to Example 1 (LSPS) and Example 4 (LNPS) was measured. LSPS and LNPS were compressively molded to form a molding body for measurement (with a diameter of 13 mm and a thickness of 0.6 mm). Then, a current was measured by applying 1 V. The result is illustrated in FIG. 6.

Figure 6:
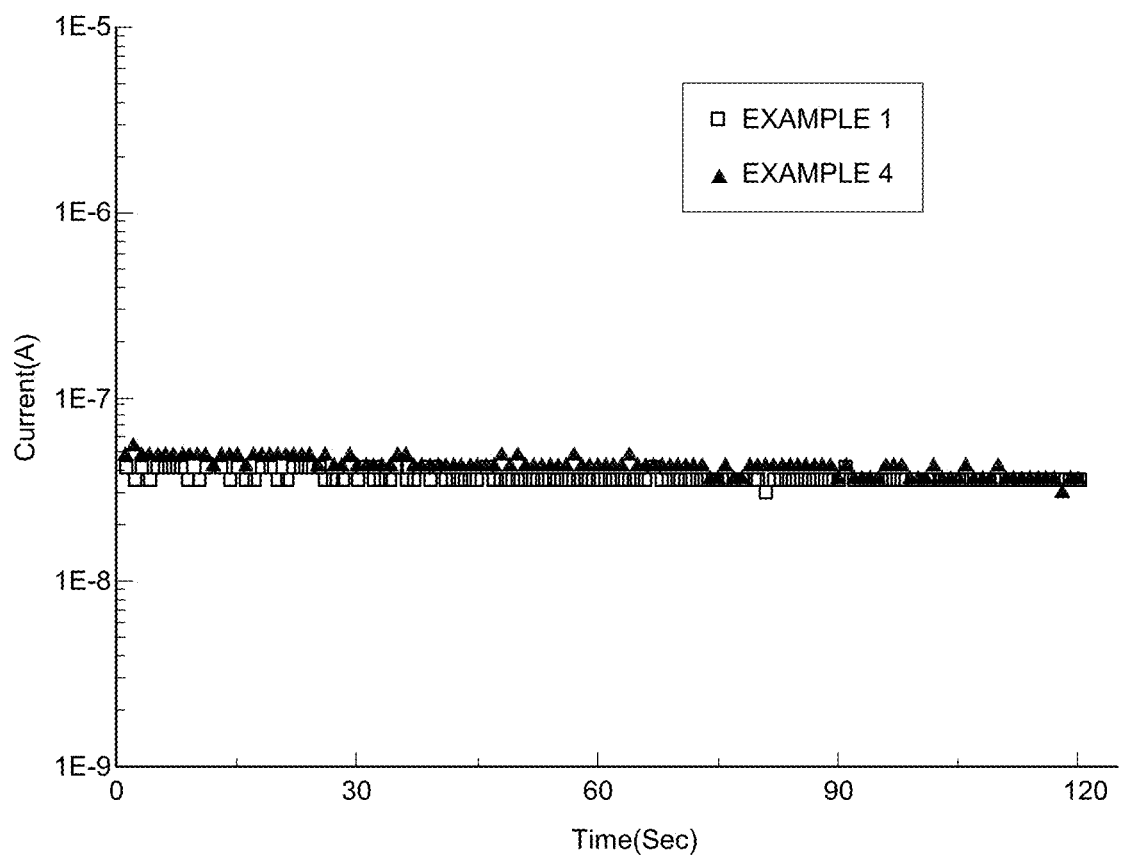
FIG. 6 is a result of measuring a current when predetermined voltage is applied to the solid electrolyte in Examples 1 and 4.

Resistance values R of the LSPS and the LNPS were calculated through FIG. 6 and the Ohm's law (V=IR). Electronic conductivity (1/R×t/A) was calculated from the resistance value R, a cross-sectional area A of the molding body for measurement, and a thickness t of the molding body for measurement. The electronic conductivity of the LSPS was calculated as $1.94 \times 10^{-9}$ S/cm, and the electronic conductivity of the LNPS was calculated as $1.88 \times 10^{-9}$ S/cm. Next, the lithium ion transport number ($\sigma_i/\sigma_e+\sigma_i$), $\sigma_i$ is conductivity of lithium ions and $\sigma_e$ is conductivity of electrons) was calculated from the electronic conductivity.

As a result, the lithium ion transport number of the LSPS was calculated as 0.9999981 and the lithium ion transport number of the LNPS was calculated as 0.9999963 to be very close to 1.

Referring to the results of Test Examples 1 and 2, it can be seen that the solid electrolyte prepared according to the present invention contributes to improvement of the characteristic of the all solid-state battery because the lithium-ionic conductivity is $10^{-4}$ S/cm or more and the lithium ion transport number is approximately 1.

Test Example 3

An all solid-state battery was manufactured by applying solid electrolytes in Example 1 (LSPS), Example ∝(LNPS) and Example 5 (LNPS-Cl) to solid electrolyte layers and a discharge capacity was measured. The all solid-state battery was constituted by a positive electrode, a negative electrode, and a solid electrolyte layer interposed between the positive electrode and the negative electrode. The solid electrolyte layer was formed with a thickness of 500 μm by compressively molding the LSPS, the LNPS, and the LNPS-Cl, and as the positive electrode, a powder containing an active material (Nb-coated NCM622), a solid electrolyte (a solid electrolyte used in the solid electrolyte layer), and a conductive material (Super C) was formed on the solid electrolyte layer with an active material loading amount of 5.8 mg/cm$^2$ and a thickness of 30 μm, and as the negative electrode, indium foil with a thickness of 100 μm was used.

With respect to the all solid-state battery, a discharge capacity was measured by performing charging and discharging under a constant current (CC) condition in a range of 2 V to 3.58 V at rate limiting of 0.02 C rate.

Figure 7:
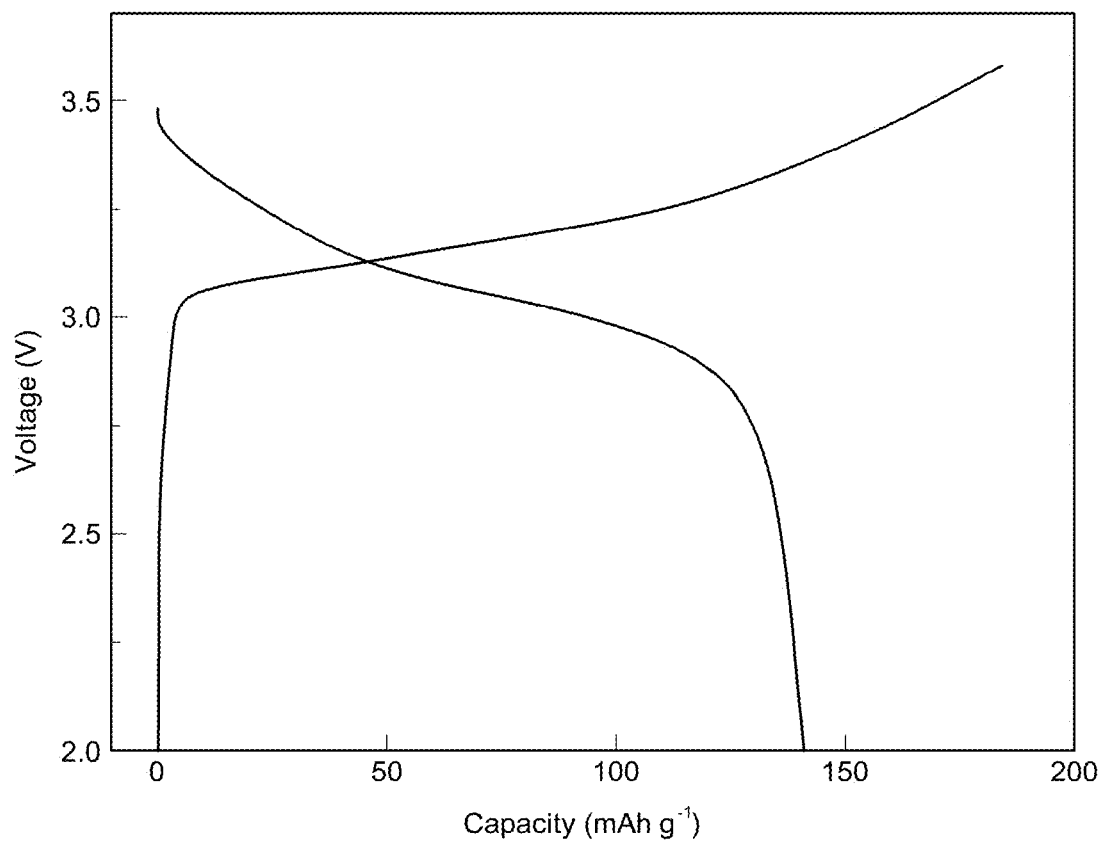
FIG. 7 is a result of measuring a discharge capacity of an all solid-state battery to which the solid electrolyte is applied in Example 1.

FIG. 7 is a result of measuring a discharge capacity of an all solid-state battery to which the solid electrolyte (LSPS) of Example 1 is applied. It can be seen that when the LSPS is applied to the solid electrolyte layer, a discharge capacity of about 140 mAh/g may be implemented.

Figure 8:
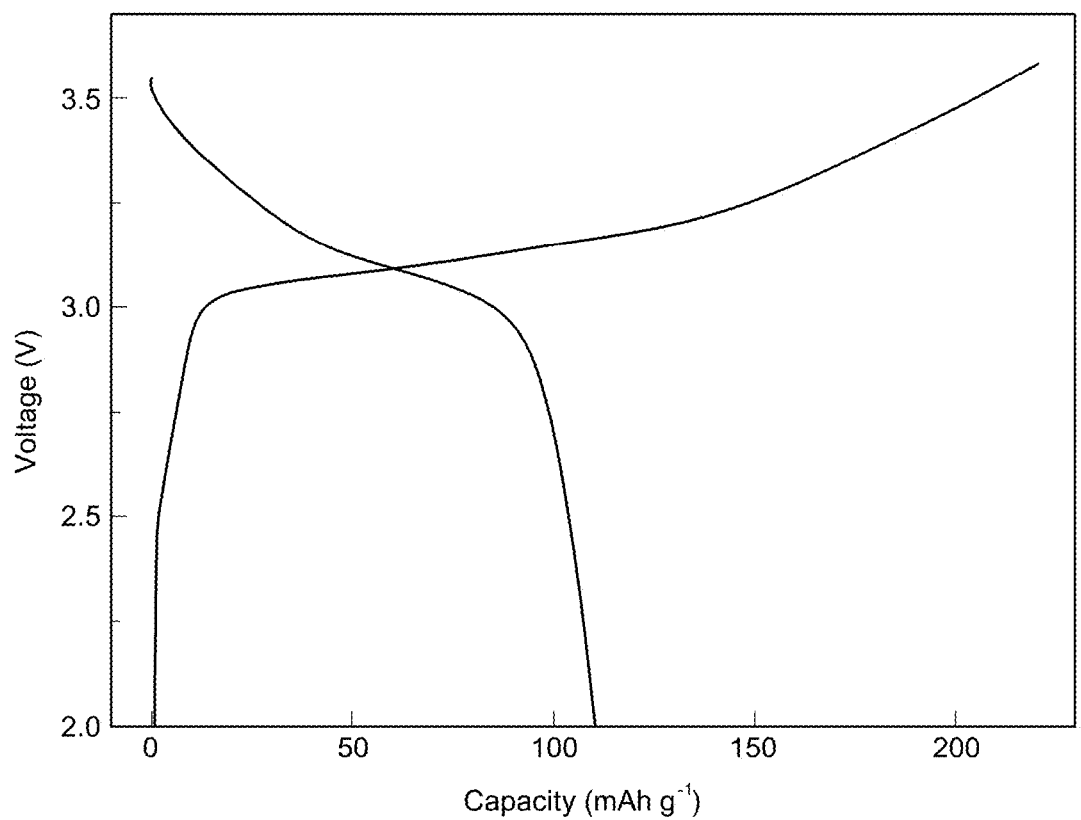
FIG. 8 is a result of measuring a discharge capacity of an all solid-state battery to which the solid electrolyte is applied in Example 4.

FIG. 8 is a result of measuring a discharge capacity of an all solid-state battery to which the solid electrolyte (LNPS) of Example 4 is applied. It can be seen that when the LNPS is applied to the solid electrolyte layer, a discharge capacity of about 110.3 mAh/g may be implemented.

Figure 9:
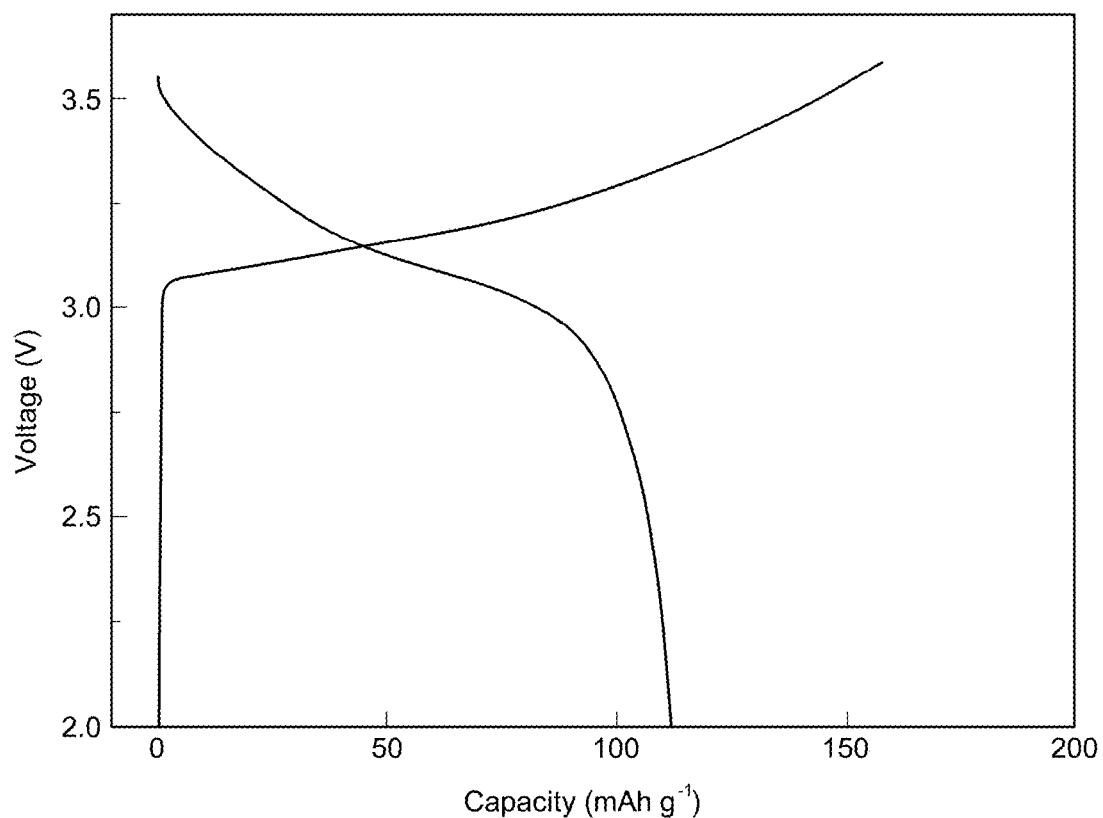
FIG. 9 is a result of measuring a discharge capacity of an all solid-state battery to which the solid electrolyte is applied in Example 5.

FIG. 9 is a result of measuring a discharge capacity of an all solid-state battery to which the solid electrolyte (LNPS-Cl) of Example 5 is applied. It can be seen that when the LNPS-Cl is applied to the solid electrolyte layer, a discharge capacity of about 111.7 mAh/g may be implemented.

According to the solid electrolyte derived from the single element and the preparing method thereof according to the present invention through Test Examples 1 to 3, it can be seen that the solid electrolyte capable of implementing equivalent or higher lithium-ionic conductivity and a discharge capacity can be obtained at much lower material costs than the related art.

Accordingly, embodiments of the present disclosure describe a solid electrolyte derived from single element powders and not based on compound powders.

The present invention proposes a new paradigm for the solid electrolyte and the preparing method thereof beyond the old framework in the related art. Therefore, it will be apparent to those skilled in the art that clues capable of overcoming the limitations of mass production and a large area of the all solid-state battery can be obtained from the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of preparing a solid electrolyte, the method comprising:
preparing a mixed powder comprising a sulfur powder, a phosphorus powder, a lithium powder, and a nickel powder, wherein the sulfur in the sulfur powder, the phosphorus in the phosphorus powder, the lithium in the lithium powder, and the nickel in the nickel powder are each in an elemental form;
milling the mixed powder to obtain an amorphous powder; and
heat-treating the amorphous powder to form a crystallized solid electrolyte, wherein the sulfur powder, the phosphorus powder, the lithium powder, and the nickel powder are mixed according to a composition of $Li_aP_bS_cNi_d$ (12≤a≤18, 0.8≤b≤6.4, 13.2≤c≤26, 1.2≤d≤9.6).

2. The method of claim 1, wherein the mixed powder consists of the sulfur powder, the phosphorus powder, and the lithium powder.

3. The method of claim 1, wherein the amorphous powder is obtained by milling the mixed powder under conditions of 300 RPM to 1000 RPM and 4 hrs to 40 hrs by using a planetary mill.

4. A method of preparing a solid electrolyte, the method comprising:
preparing a mixed powder comprising a sulfur powder, a phosphorus powder, a lithium powder, and a nickel powder, wherein the sulfur in the sulfur powder, the phosphorus in the phosphorus powder, the lithium in the lithium powder, and the nickel in the nickel powder are each in an elemental form;
milling the mixed powder to obtain an amorphous powder, wherein the milling comprises:
forming a slurry by mixing a 1 wt % to 50 wt % of the mixed powder with 50 wt % to 99 wt % of a solvent and then wet milling the slurry to obtain the amorphous powder; and
heat-treating the amorphous powder to form a crystallized solid electrolyte, wherein heat-treating the amorphous powder comprises heat-treating the wet milled slurry, wherein the sulfur powder, the phosphorus powder, the lithium powder, and the nickel powder are mixed according to a composition of $Li_aP_bS_cNi_d$ (12≤a≤18, 0.8≤b≤6.4, 13.2≤c≤26, 1.2≤d=9.6).

5. The method of claim 4, wherein the solvent is at least one selected from a group consisting of:
at least one hydrocarbon-based solvent of pentane, hexane, 2-ethyl hexane, heptane, octane, cyclohexane, and methyl cyclohexane;
at least one BTX-based solvent of benzene, toluene, xylene, and ethylbenzene;
at least one ether-based solvent of diethyl ether, tetrahydrofuran, and 1,4-dioxane;
at least one ester-based solvent of ethyl propionate, and propyl propionate; or a mixture thereof.

6. The method of claim 1, wherein the milling comprises dry milling.

7. The method of claim 1, wherein the heat-treating comprises heat-treating the amorphous powder at 200° C. to 500° C. and 1 min to 100 hrs.

8. The method of claim 1, wherein the preparing, the milling, and the heat-treating are performed in a dry room.

9. A method of preparing a solid electrolyte, the method comprising:
preparing a mixed powder comprising a sulfur powder, a phosphorus powder, a lithium powder, and a nickel powder, wherein the sulfur in the sulfur powder, the phosphorus in the phosphorus powder, the lithium in the lithium powder, and the nickel in the nickel powder are each in an elemental form;
adding the mixed powder in to a solvent;
wet milling the mixed powder in the solvent, wherein the wet milling amorphizes the mixed powder in the solvent; and
heat-treating the amorphized mixed powder in the solvent, wherein the heat-treating removes the solvent and crystallizes the amorphized mixed powder to form the solid electrolyte,
wherein the sulfur powder, the phosphorus powder, the lithium powder, and the nickel powder are mixed according to a composition of $Li_aP_bS_cNi_d$ (12≤a≤18, 0.8≤b≤6.4, 13.2≤c≤26, 1.2≤d≤9.6).

10. The method of claim 9, wherein the mixed powder consists of the sulfur powder, the phosphorus powder, and the lithium powder.

11. The method of claim 9, wherein the wet milling comprises milling the mixed powder under conditions of 300 RPM to 1000 RPM and 4 hrs to 40 hrs by using a planetary mill.

12. The method of claim 9, wherein adding the mixed powder in to the solvent comprises:
mixing a 1 wt % to 50 wt % of the mixed powder with 50 wt % to 99 wt % of the solvent.

13. The method of claim 9, wherein the solvent is a solvent selected from a group consisting of:
a hydrocarbon-based solvent of pentane, hexane, 2-ethyl hexane, heptane, octane, cyclohexane, or methyl cyclohexane;
a BTX-based solvent of benzene, toluene, xylene, or ethylbenzene;
an ether-based solvent of diethyl ether, tetrahydrofuran, or 1,4-dioxane; and
an ester-based solvent of ethyl propionate, or propyl propionate.

14. The method of claim 9, wherein the heat-treating comprises heat-treating at 200° C. to 500° C. and 1 min to 100 hrs.

15. The method of claim 9, wherein the preparing, the adding, the wet milling, and the heat-treating are performed in a dry room.

16. The method of claim 4, wherein the mixed powder consists of the sulfur powder, the phosphorus powder, and the lithium powder.

17. The method of claim 4, wherein the amorphous powder is obtained by milling the mixed powder under conditions of 300 RPM to 1000 RPM and 4 hrs to 40 hrs by using a planetary mill.

18. The method of claim 4, wherein the heat-treating comprises heat-treating the amorphous powder at 200° C. to 500° C. and 1 min to 100 hrs.

19. The method of claim 4, wherein the preparing, the milling, and the heat-treating are performed in a dry room.

* * * * *